Figure 4:
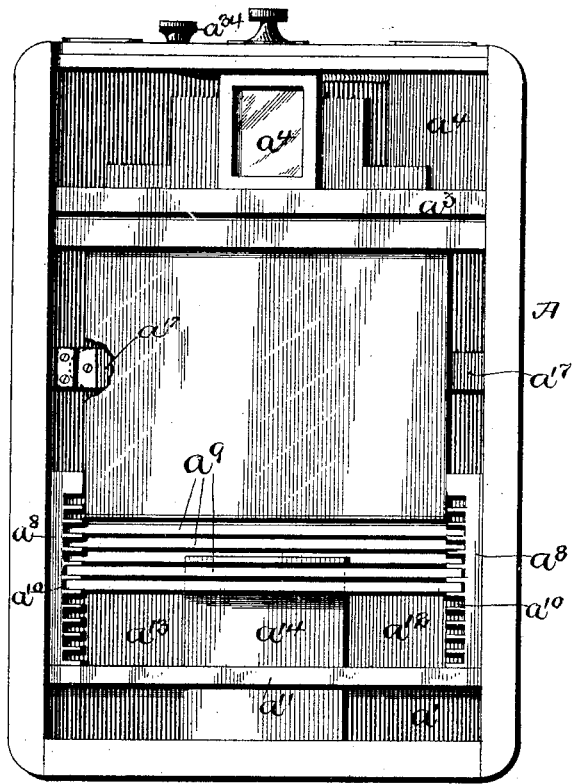

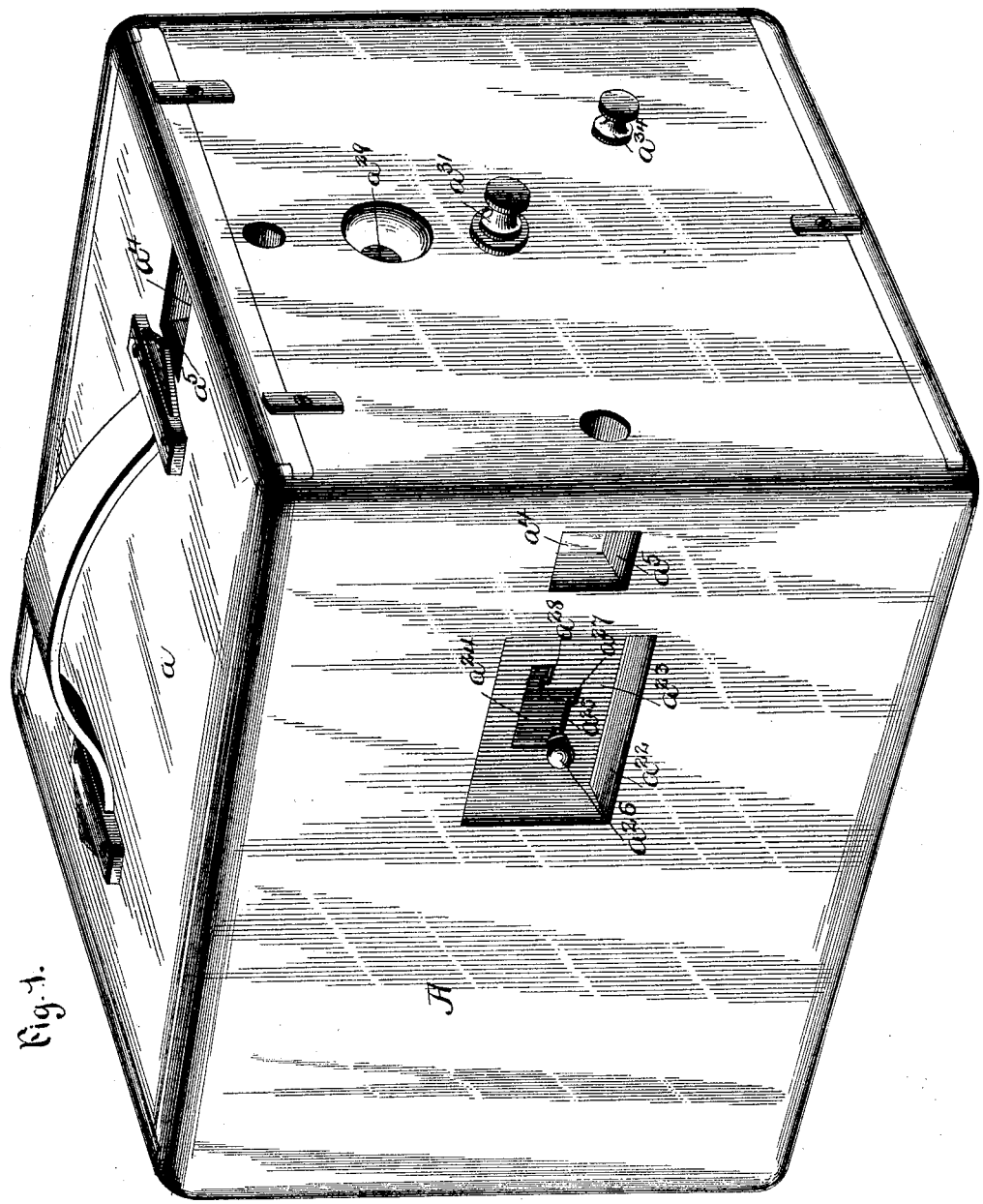

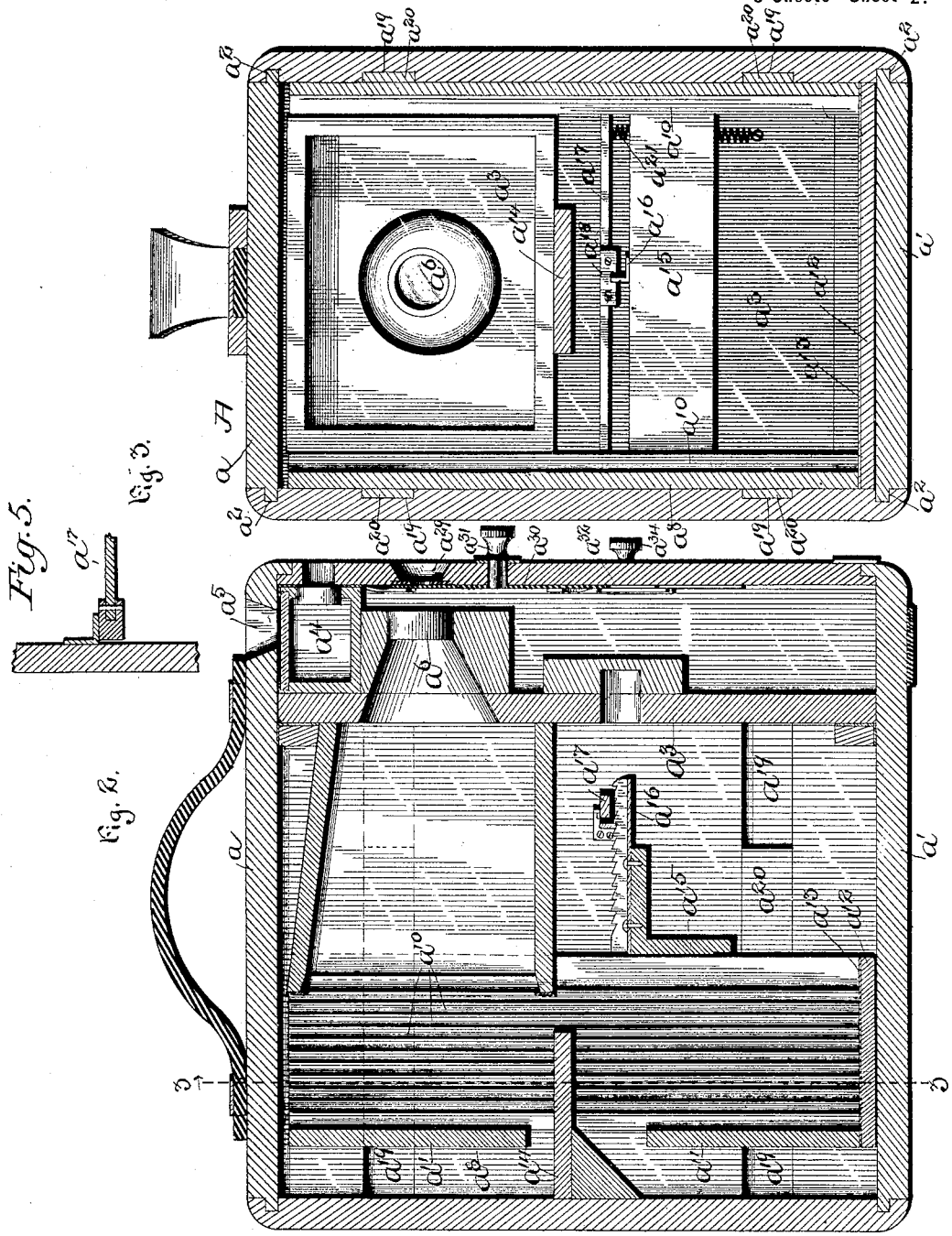

UNITED STATES PATENT OFFICE.

NAPOLÉON EMILE MARCHAND, OF MONTREAL, CANADA.

MAGAZINE-CAMERA.

SPECIFICATION forming part of Letters Patent No. 636,823, dated November 14, 1899.

Application filed April 13, 1898. Serial No. 677,508. (No model.)

*To all whom it may concern:*

Be it known that I, NAPOLÉON EMILE MARCHAND, a subject of Her Majesty the Queen of Great Britain, residing in the city and district of Montreal, Province of Quebec, Canada, have invented certain new and useful Improvements in Cameras; and I do hereby declare the following to be a clear, full, and exact description of the invention, such as will enable others skilled in the art to which it appertains to make and use the same.

My invention relates to improvements in cameras.

The object of my invention is to provide a camera which will be neat and attractive in appearance, durable in construction, and which can be made at a moderate cost.

A further object is to provide a camera with a holder for a series of sensitive plates, the holder being arranged to bring each successive plate into the proper focus, thus enabling each plate to be the same distance from the lens when the shutter is opened.

To these ends my invention consists in the improved construction and combination of parts hereinafter fully described, and particularly pointed out in the appended claims.

In the drawings, in which similar letters of reference indicate similar parts in all of the views, Figure 1 is a perspective view of my improved camera. Fig. 2 is a vertical longitudinal section of the same. Fig. 3 is a vertical transverse section taken on line 3 3 of Fig. 2. Fig. 4 is a plan view of the camera with the top removed.

Cameras as heretofore constructed have been expensive to manufacture owing to the cost of the material used and, in addition, to the time necessarily employed in their manufacture. In addition to this the cameras used at present, and especially those known as "kodaks," are not generally provided with a holder in which a number of plates can be placed and which can be moved out of operative position without removing each portion of the interior mechanism or without changing the position of the plate when in use, some of the latter being provided with mechanism for dropping the plate from one position to another; but the holder for the plate must be rotated forward and then brought back when another plate drops into position.

To obviate these disadvantages and to make a camera which is perfect in construction and operation, I have provided the following mechanism:

A designates a camera, which in the present instance I have shown as having a fixed focus, forming one of the cheaper grades of cameras. The camera is formed with a sliding top $a$ and sliding bottom $a'$, which are adapted to be moved in suitable slides $a^2$, formed at the top and bottom of the sides of the camera. Mounted within the chamber formed by the inclosing parts is a vertical transverse plate $a^3$, secured to the sides near the front end of the chamber. To the front side of the plate $a^3$ are secured the usual range-finders $a^4$, suitable openings $a^5$ in the top and one side being arranged to expose the surface of the ground glass of each finder. The plate $a^3$ is also provided with a suitable lens $a^6$, and to the rear face of said plate is secured the usual box or bellows.

Mounted within the chamber and having a longitudinal movement therein is a suitable holder $a^8$, which extends from the top to the bottom of said chamber and is adapted to contain a series of sensitive plates $a^9$, the holder being provided with suitable vertically-disposed slides $a^{10}$, extending the entire height of said holder. The slides $a^{10}$ are arranged on each side of the chamber, the two series of slides being connected at their rear end by suitable connections $a^{11}$, the lower end of the holder being provided with a removable plate $a^{12}$, said plate being provided on its upper face with a suitable cushion $a^{13}$, on which the plates are adapted to fall.

Fixedly connected to the rear of the camera is a forwardly-extending rest $a^{14}$, said rest extending outwardly a distance sufficient to support the sensitive plates when the holder $a^8$ is in its rear position, but which will allow when the holder $a^8$ is moved forward the distance of one slide the first sensitive plate, which has now been exposed, to drop downward in its slide and rest on the plate $a^{12}$, the sensitive plate being adapted to slide over the upper face of the rest $a^{14}$ as the holder is moved forward.

The holder $a^8$ is provided with a connection $a^{15}$, extending across and connecting the slides $a^{10}$ at the front of the holder. To this connection is secured a suitable rack $a^{16}$. Hingedly connected to one side of the camera is a transverse operating-bar $a^{17}$, which is pivotally connected to its hinged connection with the camera in order that it may have both vertical and horizontal movement. To this bar is secured a plate $a^{18}$, which is adapted to operate in said rack in such manner that a forward movement of the free end of the bar $a^{17}$ will move the holder $a^8$ forward the distance of one of the slides $a^{10}$, the holder moving forward in suitable longitudinal slides $a^{19}$, arranged in the sides of the camera, the holder $a^8$ being provided with suitable slide-blocks $a^{20}$, adapted to move in the slides $a^{19}$. A spring $a^{21}$, secured to the side of the camera and to the free end of the bar $a^{17}$, serves to normally hold the plate $a^{18}$ in position on the rack $a^{16}$. One of the sides of the camera is provided with an opening $a^{24}$, said opening being arranged to form a slide $a^{25}$ for a suitable pin $a^{26}$, secured in the end of the bar $a^{17}$, and also to form two notches $a^{27}$ $a^{28}$, the former being arranged at a point below the slide $a^{25}$, while the notch $a^{28}$ is arranged on a plane above said slide $a^{25}$. The arrangement of the slide $a^{25}$ and notches $a^{27}$ $a^{28}$ is such that, the pin $a^{26}$ resting on the slide $a^{25}$, the plate $a^{18}$ will engage with one of the teeth of the rack $a^{16}$. When the pin $a^{26}$ is moved forward on the slide, it carries with it the holder $a^8$ the distance of one of the slides $a^{10}$, thereby releasing the plate from the rest $a^{14}$ and allowing it to drop on the removable plate $a^{12}$. When the pin $a^{26}$ has reached its forward limit of movement, it will be above the notch $a^{27}$, and when in this position the spring $a^{21}$ will serve to draw it downward into the notch, in which position the pin can move neither backward nor forward, and thus holds the holder $a^8$ in fixed position. When the exposure has been made, the pin is raised to the top of the opening $a^{24}$ and moved rearward until it reaches the rear of said opening, when it is moved downward into the slide $a^{25}$ and the former operation repeated. When all the plates are exposed and are located on the removable plate $a^{12}$ and after the plates have been removed from the camera and it is desired to move the holder back into its rear position to enable it to be refilled, the pin $a^{26}$ is raised upward and placed in the notch $a^{28}$, which movement of the pin takes the plate $a^{18}$ out of the path of movement of the rack $a^{16}$, and thus allows the holder to be moved backward and forward, as desired.

It will be apparent that after the plates have all been exposed and are resting on the removable plate $a^{12}$, the camera can be "unloaded" by simply removing the bottom $a'$ and the plate $a^{12}$, when the plates will drop out of their respective slides into the hand or any other suitable receptacle, the plates being in exactly the same position as they were taken, it being readily understood that the plate never leaves its slide after having been placed in the camera.

The front of the camera is provided with suitable openings for the range-finders. It is also provided with a suitable exposure-opening $a^{29}$, in rear of which a suitable shutter mechanism is located, said mechanism being of any necessary construction, the same not forming a particular part of my invention.

The operation of the camera is thought to have been clearly set forth, and it is therefore not reiterated.

The interior of the camera is obviously made light-proof within the framework, and the general interior parts are made of wood covered, preferably, with leather-board, thus making an exceedingly cheap device and one which will operate perfectly.

It will be obvious that inasmuch as the rest $a^{14}$ extends forward a suitable distance and the holder-operating mechanism has a fixed movement each plate will be brought forward to the same point in the camera, thus guaranteeing the same focus for each and every plate, while by the use of the slides $a^{10}$ each plate must retain its relative position in the camera, this preventing any liability of the plates becoming mixed while in the camera awaiting development. By making a record of the view taken it will be perceived that the corresponding plate can be readily taken from the camera.

Having thus described my invention, what I claim as new is—

1. The combination with a camera, having a sliding plate-carriage; of means pivotally mounted for moving said carriage forwardly; and means for holding said carriage against movement, when said carriage is in position ready for exposure, substantially as described.

2. The combination with a camera having a sliding plate-carriage; of means pivotally and hingedly mounted, for moving said carriage forwardly, said means having a movement into and out of operative connection with said carriage, substantially as described.

3. The combination with a camera having a sliding carriage, said carriage having a rack; of a pivotally and hingedly mounted lever, adapted to contact with said rack to move said carriage forwardly; means for limiting the movement of said lever; and means for holding said lever against movement when said carriage has reached its proper position for exposing the plates, substantially as described.

4. The combination with a camera having a sliding carriage, said carriage having a rack; of a lever, adapted to contact with said rack to move said carriage forwardly; and means for securing said lever in operative and inoperative contact with said rack, substantially as described.

5. The combination with a camera having a sliding carriage, said carriage having a rack; of a pivotally-mounted lever, adapted to contact with said rack to move said carriage forwardly; means for limiting the movement of said lever; and means for holding said lever against movement when said carriage has reached its proper position for exposing the plates, substantially as described.

6. A magazine-camera, comprising a frame; a lens mounted therein; a holder slidably mounted in said frame; a rack secured to said holder; an operating-plate pivotally mounted in said framework and adapted to engage with said rack to move said holder forwardly, said plate being held in fixed position during the period of exposure; and a rest fixedly secured to said frame and extending forwardly in the path of movement of said holder, substantially as described.

7. A magazine-camera, comprising a frame; a lens mounted therein; a holder slidably mounted in said frame; a rack secured to said holder; an operating-plate pivotally mounted in said framework and adapted to engage with said rack to move said holder forwardly, said plate being held in fixed position during the period of exposure; means for regulating the length of movement of said rack; and a rest fixedly secured to said frame and extending forwardly in the path of movement of said holder, substantially as described.

8. A magazine-camera, comprising a frame; a lens mounted therein; a holder slidably mounted in said frame; a rack secured to said holder; an operating-plate pivotally mounted in said framework and adapted to engage with said rack to move said holder forwardly; means for limiting the movement of said rack; means for holding said rack in fixed position during the exposure; and a rest fixedly secured to said frame and extending forwardly in the path of movement of said holder, substantially as described.

In witness whereof I have hereunto set my hand in the presence of two witnesses.

NAPOLÉON EMILE MARCHAND.

Witnesses:
   J. A. MARION,
   HORACE G. SEITZ.